United States Patent [19]
Chambers

[11] Patent Number: 6,113,124
[45] Date of Patent: Sep. 5, 2000

[54] ALUMINUM SIDE RAIL BOAT TRAILER

[75] Inventor: J. Bruce Chambers, Newtown, Pa.

[73] Assignee: Load Rite Trailers, Inc., Fairless Hills, Pa.

[21] Appl. No.: 09/176,644

[22] Filed: Oct. 21, 1998

[51] Int. Cl.[7] .................................................. B60P 3/10
[52] U.S. Cl. ...................................... 280/414.1; 114/344
[58] Field of Search ............................ 280/414.1, 414.2, 280/414.3, 686; 114/344; 780/124.125, 124.17

[56] References Cited

U.S. PATENT DOCUMENTS

| | | | |
|---|---|---|---|
| 3,104,770 | 9/1963 | Calkins | 280/414.1 |
| 4,697,976 | 10/1987 | Godbersen | 280/414.1 |
| 4,934,895 | 6/1990 | Thibodeaux | 280/414.1 |
| 5,133,570 | 7/1992 | Godbersen | 280/414.1 |
| 5,332,249 | 7/1994 | Solberg et al. | 280/414.1 |
| 5,632,504 | 5/1997 | Gallagher | 280/414.1 |
| 5,810,546 | 9/1998 | Schmoling | 114/344 |

FOREIGN PATENT DOCUMENTS

| | | | |
|---|---|---|---|
| 2048336 | 2/1993 | Canada | 280/414.1 |
| 2055766 | 3/1993 | Canada | 280/414.1 |

Primary Examiner—Anne Marie Boehler
Attorney, Agent, or Firm—John J. Simkanich

[57] ABSTRACT

A bunk-style boat tailer is made with aluminum side rails and aluminum cross beams. A wheel and axle assembly is attached to the side rails near the rear of the trailer. The bunk beams are positioned so that approximately ¾ of the length of the bunks is rearward of the axle mounting position. A front support of the bunk beams is attached to the side rails just forward of the axle mounting position. A rear support of the bunk beams is attached to the side rails at their rearward end. This cantilevers approximately ⅓ of the length of the bunks beyond the rear of the end of the side rails. A truss assembly structure transfers the load from the bunk supports to the wheel and axle assembly thereby reducing further the bending forces on the trailer side rails. This truss assembly also boxes the bunk support region of the trailer frame to reduce torsion forces. A wiring harness channel extends the length of at least one side rail.

15 Claims, 5 Drawing Sheets

ALUMINUM SIDE RAIL BOAT TRAILER

BACKGROUND OF THE INVENTION

The present invention is directed generally to bunk support type boat trailers, and more particularly to those such bunk beam boat trailers where the side rails and other main structural members are constructed of aluminum. Boat trailers are presently found in Class 280, subclass 414.1 et seq.

Boat trailers, especially those trailers for carrying considerable weight, have typically been made of steel construction. The trailer frame side rails and cross members have been made of carbon or alloy steel materials which have required painting or galvanizing.

The use of steel materials and the additional surface preparation of the steel frame members has provided a trailer structure which is heavier than trailers of other metal construction, and which coated steel members generally loose their surface sheen appearance after short periods of exposure to water, especially salt water. Aluminum trailer frame construction has become common place on trailers used to carry lighter personal water craft (PWC) and small row boats. Aluminum alloys containing small amounts of chromium or molybdenum have superior surface sheen which lasts over long periods of water exposure. Aluminum frame construction also yields a lighter trailer which is easier to manipulate and has a lower towing weight than comparable steel construction.

Aluminum, however, does not have the same flexural characteristics as steel. It does not have the same elastic limits. Aluminum cannot be heat treated as steel can to increase its elasticity or bending strength. Being more brittle than steel, aluminum as a trailer frame construction material, has raised certain limitations in its use for larger trailers.

Trailer frame side rails, which generally utilize either tube construction or I-beam construction, are subjected to considerable bending and flexure, during over-the-road travel. These bending forces are concentrated on the unsupported middle span of the side rails. In bunk style trailers, this bending action is accentuated as the bunk beams are supported by the side rails at only two and sometimes three points. On support point has been forward of the axle assembly.

Therefore, in classic bunk trailer construction as is used for heavier loads, aluminum side rails would be subjected to severe bending forces which may lead to side rail failures. These load induced flexural forces when applied to the lighter weight aluminum trailer may also create unstable tracking of the trailer behind the towing vehicle.

What is desired is an aluminum frame bunk boat trailer construction where the frame loading is distributed to reduce and minimize bending forces on the frame side rails.

What is further desired is a bunk trailer construction where the major load forces are carried by the bunk assembly and transferred to the aluminum frame (side rails) in the region of the attachment of the wheel axle assembly, whereof said region is reinforced against bending forces.

What is also desired is a bunk trailer construction where the points of load forces and the points of support forces, on the aluminum frame side rails, are more evenly distributed to reduce the resultant bending forces especially in the unsupported middle section of the aluminum side rail's span.

SUMMARY OF THE INVENTION

The objectives of the present invention are achieved in an aluminum frame bunk style boat trailer construction with aluminum I-beam side rails and tubular aluminum cross beams. The amount of the boat's weight (load forces), normally supported by the trailer's frame forward of the trailer's wheel and axle assembly, are reduced thereby reducing the bending forces on the middle section of the trailer's side rails.

A bunk beam (bunk rail) front support is positioned on the side rails immediately adjacent to and just forward of the axle assembly. A bunk beam rear support is positioned at the rear most point on the side rails. The bunk beams extend rearward of the end of the side rails to cantilever at least ⅓ of their length beyond the end of the trailer (i.e., the bunk beam's rear support). The wheel and axle assembly is attached to the side rails near the rear of the trailer at a position about ⅕ the length of the trailer. Approximately ¾ of the length of the bunk beams is rearward of the axle assembly side rail mounting position.

The wheel and axle assembly includes leaf springs mounted along the side rails and connected thereto to form a truss type support along a length of each side rail. This truss type support makes that section of each side rail more rigid and reduces the effects of the bending forces place on each side rail by the bunk beam support attachments.

The bunk beams are made in multi-piece construction. Flat bunk plates contact and support the boat's hull. Rectangular bunk support tubes are used to support the flat bunk plates. Swivel plate assemblies hold the bunk plates above the rectangular bunk support tubes and allow the bunk plates to swivel about a longitudinal axis to conform to the boat hull angle. Typically, there are two such swivel plate assemblies. However, the number of these swivel plate assemblies can vary with the design capacity. The rectangular bunk support tubes are attached to the tubular aluminum cross beams which extend between the I-beam side rails.

A bow roller assembly and bow stop roll are mounted on individual cross rails each extending between the I-beam side rails at the front of the trailer. A hitch is mounted to a hitch support tube which extends forward of the ends of the side rails. A winch stand is also mounted on the hitch support tube. This hitch support tube joins the I-beam side rails to seat inside their top and bottom flanges. Bolt and clamp attachments are used throughout the trailer assembly.

The side rails each carry an electrical conduit passageway under the top flange thereof and positioned against the web. This passageway facilitates the installation of electrical lights on the trailer and protects the wiring.

A boat carried on the trailer has its major weight component applied to the side rails at the position of the bow roller and at the position of the cross member attachment rearward of the axles. A lesser boat weight component is applied forward the axle assembly position. The weight of the boat is thereby balanced throughout the length of the side rails which reduces the bend forces in unsupported length of the side rails extending between the hitch and the axle position.

DESCRIPTION OF THE DRAWINGS

The features, advantages and operation of the present invention will become readily apparent and further understood from a reading of the following detailed description with the accompanying drawings, in which like numerals refer to like elements, and in which.

DETAILED DESCRIPTION OF THE INVENTION

Figure 1:
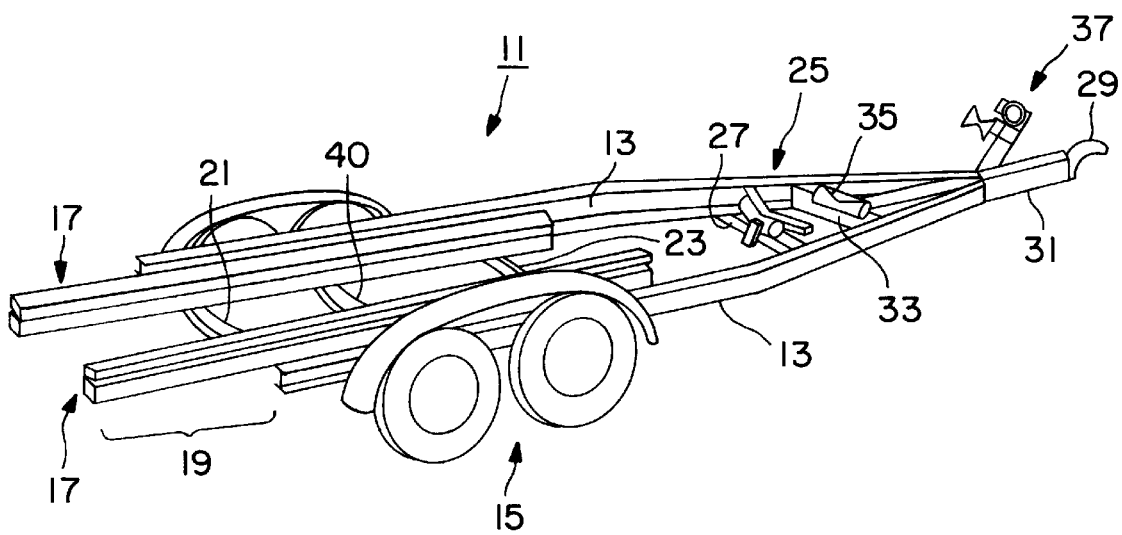
FIG. 1 is a perspective view of the aluminum side rail bunk style trailer of the invention.

The present invention, FIG. 1, is a bunk style trailer 11 made with an aluminum frame. The trailer's frame has aluminum I-beam side rails 13, on each side thereof, carried on a tandem wheel and axle assembly 15. Two boat hull supporting bunks 17 are mounted on the rearward portion of these frame side rails 13, and extend from just forward of the axle assembly 15 to beyond the end of the side rails 13 a cantilevered distance 19. Tubular aluminum bowed cross beam members 21, 23 extend between the two side rails 13 and support the bunks 17. The bunks 17 are supported on these tubular cross beam members 21, 23 inboard of the side rails 13.

A bow roller assembly 25 is mounted on a separate bowed aluminum rectangular tube cross member 27 near the front of the frame 11. The side rails 13 are bolted together at the front of the frame 11. A hitch 29 tubular aluminum support tube 31 extends between the ends of the two side rails 13. An L-shaped bracket 33 extends between the side rails forward of the bow roller assembly 25 and carries a bow stop roll 35. A winch stand 37 is mounted onto the tubular hitch support tube 31 just forward of its attachment to the side rails 13.

Figure 2:
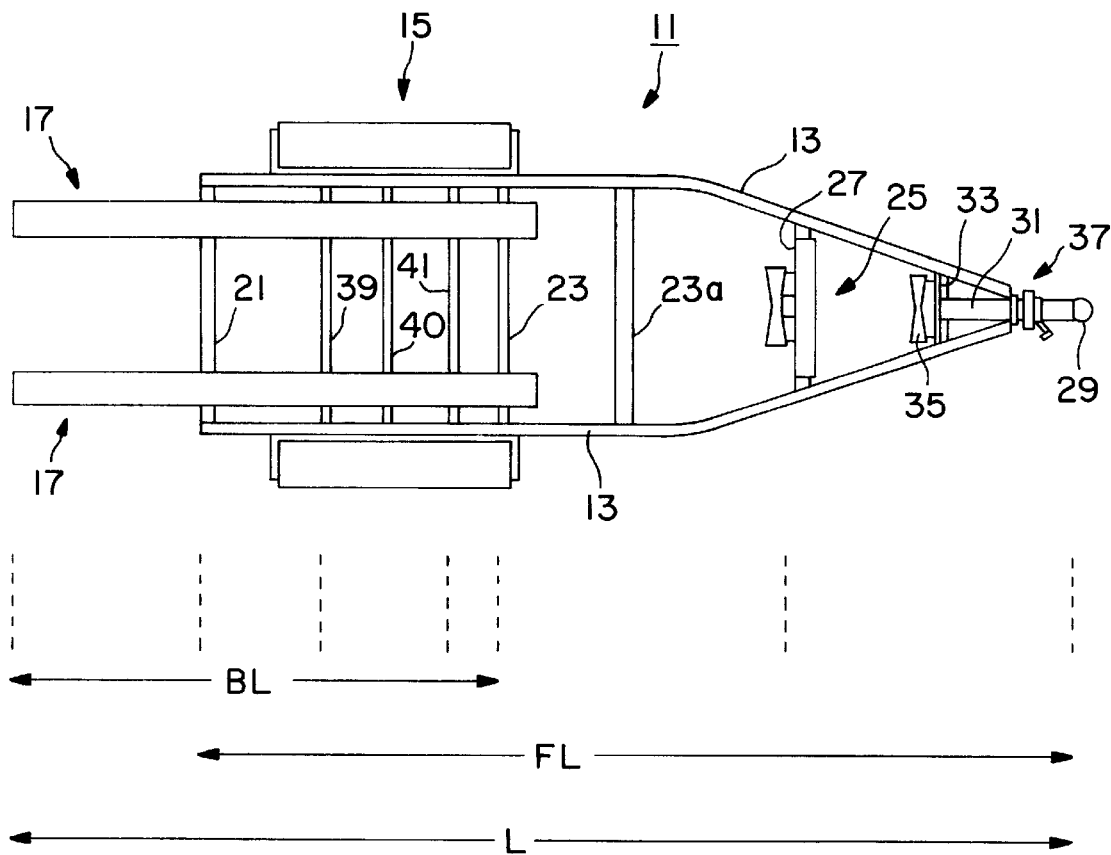
FIG. 2 is top plan view of the trailer invention shown in FIG. 1.

The assembly relationship and positioning of the components can better be viewed in FIG. 2. The frame rails 13 and hitch support tube 31 define the working length of the trailer frame itself. The bunks 17 are mounted to the rear of the frame and extend rearward beyond the end of the frame rails 13. The two bunk bearing tubular cross members 21, 23 are seen in their positional relationship to the dual axles 39, 41. These two bunk 17 bearing cross members position the load points on the side rails 13.

A truss structure assembly reinforces and supports the load bearing region of each side rail 13. This load bearing region comprises the section of the side rails 13 between the attachments of the bunk bearing cross members 21, 23. A truss cross bar 40 is positioned intermediate the bunk bearing cross members 23, 39. This truss structure assembly will be described further below. An additional bowed tubular cross member 23a can be positioned between the front bunk support cross member 23 and the bow roller assembly 25. This will add lateral stabilization to the side rails 13 at their longest unsupported region to reduce twisting.

The trailer 11 is assembled with bolts and clamps so that the respective members may be moved and fixed in alternative distances to one another. This permits a certain amount of adjustment of the distribution of boat weight on the trailer 11 members, as the weight, shape and size of the boat varies. Generally, the trailer 11, FIG. 2, is set up so that the frame length (FL) is 80–85% of the overall length (L). The bunk 17 length (BL) extends from just forward of the axle assembly 15 position to a position beyond the end of the side rails 13 thereby establishing a bunk cantilevered length (BCL) of about 30–35% of the bunk length (BL). This positions about 70–80% of the bunk length (BL) rearward of the axle assembly 15 position. The bunk length (BL) may be from 40–55% of the overall length (L).

Figure 3:
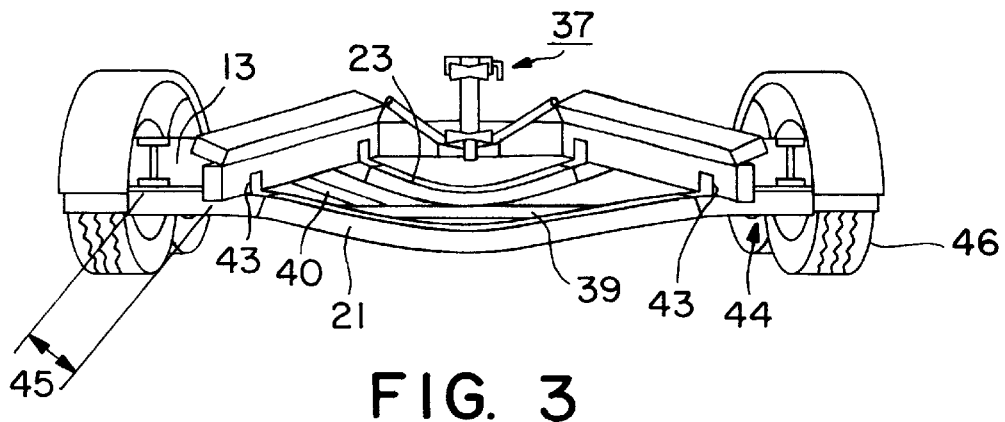
FIG. 3 is a rear end view of the trailer showing the multi-piece bunk beam construction.

The cross members 21, 23, 23a are bowed downward in the middle, FIG. 3, to provide room for the boat hull extension. The bunks 17 are held by L-shaped brackets 43 to the respective cross members 21, 23. This bunk 17 structure will be discussed in greater detail below. The bunk set-in distance 45 is adjusted to accommodate hull shape and hull beam width. The truss structure assembly 44 includes tandem mounted leaf type springs adjacent tandem wheels 46.

Figure 4:
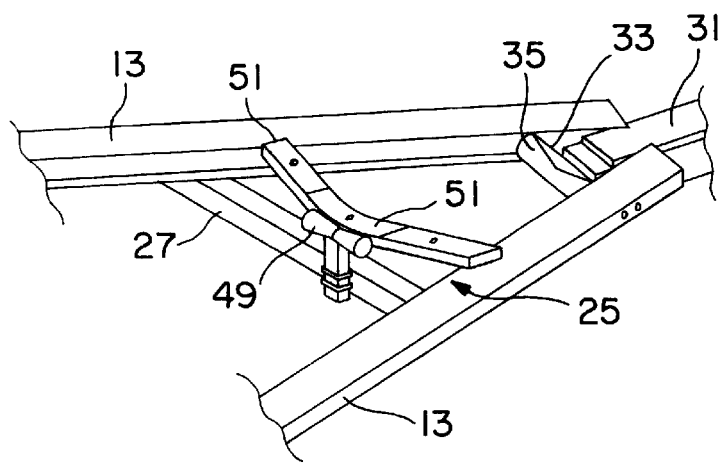
FIG. 4 is a partial perspective view of the trailer showing the bow roller assembly and bow stop roll construction and mounting.

The bow roller assembly 25, FIG. 4, is bolted to the bow roller cross member 27, by use if an upstanding post 53. The bow roller cross member 27, which is a rectangular tube, is bolted to the bottom flange of each side rail 13. This assembly 25 includes a bracket 47, shown FIG. 5, which carries a rubber bow roller 49. Positioned on top of the upstanding post 53 is a winged keel guide 51. This keel guide 51 is a flat bar which has a rubber sliding surface on its upward face.

Figure 5:
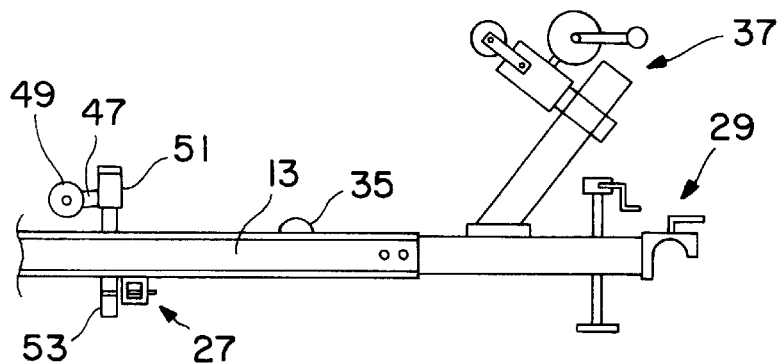
FIG. 5 is a partial side view of the front of the trailer showing the hitch, hitch support tube, winch stand, bow roller with winged keel guide, and bow stop roll.

The bow stop roll 35, the L-shaped bracket 33 extending between the side rails 13 to which the stop roll 35 is attached, and the attachment of the hitch support tube 31 to the L-shaped bracket 33 and to each of the side rails 13 is also seen in FIG. 4. These structures are also shown in FIG. 5.

The bow roller bracket 47 is welded to the vertical upstanding post 53. This vertical post 53 is clamped to the side of the bow roller cross member 27, which clamping permits a degree of vertical adjustment of the height of the roller bracket 47, the roller 49, and the keel guide 51. The stop roll 35 is optional and is recessed at the height of the side rails 13. For smaller and lighter boats, the bow roller assembly 25 bears the entire weight of the bow of the boat and there is no need to include a stop roll 35.

Figure 6:
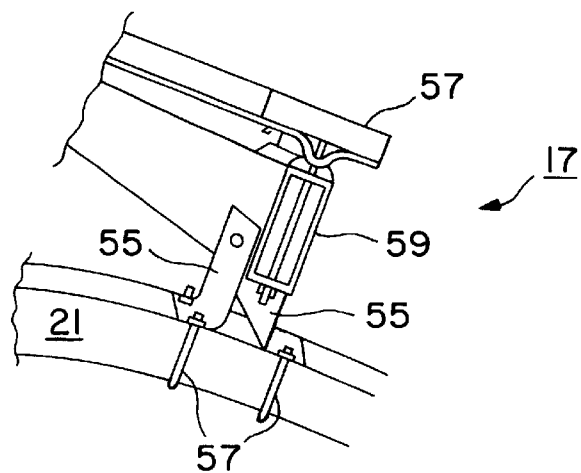
FIG. 6 is a perspective partial view of the bunk beam multi-piece construction.
Figure 7:
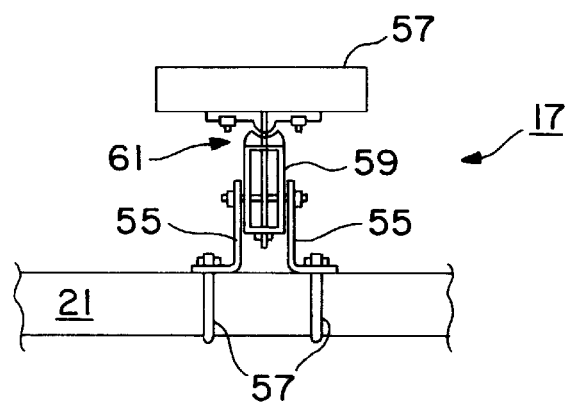
FIG. 7 shows the multi-piece bunk beam of FIG. 8 in an end view.

The bunks 17 are a multi-pieced assembly, FIGS. 6, 7. A pair of L-shaped bunk brackets 55 are utilized at each cross beam 21, 23 attachment point. These L-shaped bunk brackets 55 are each clamped 57 into position on the respective cross beam 21, 23 thereby allowing for adjustment in lateral positioning. Flat bunk plates 57 are made from hardwood boards and positioned to lay flat against the boat's hull thereby providing a larger support surface for the typical fiberglass hull, and reducing localized stress points on the hull. The boards 57 are each covered with a nylon or other synthetic material carpet covering used on trailer bunks to facilitate sliding.

The flat plates 57 extend the working length of the bunks 17. Each plate 57 is supported from bending by being mounted on an aluminum rectangular bunk support tube 59.

The rectangular bunk support tube 59 is bolted to paired bunk brackets 55. These brackets 55 hold the bunk support tube 59 to a cross beam 21, 23, at each attachment point.

A series of swivel plate assemblies 61 join each bunk flat plate 57 to its respective rectangular bunk support tube 59. The numbers of these swivel plate assemblies, positioned evenly along the lengths of each flat plate 57 in juxtaposition to its respective rectangular support tube 59, will depend upon the length of the bunk 17, the stiffness of the flat plate 57, and the weight of the boat. For smaller, lighter loads only two swivel plate assemblies 61 may be used on each bunk 17.

Figure 8:
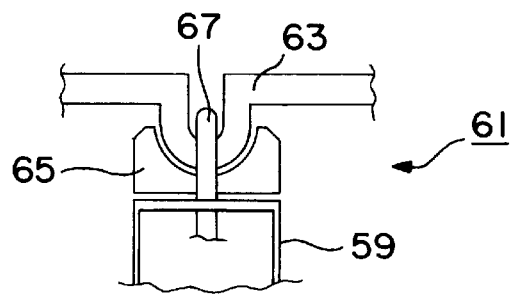
FIG. 8 is an enlarged view of the bunk beam plate swivel.

The swivel plate assembly 61, FIGS. 7 & 8, permits the hull contacting flat plate 57 to rotate to hull shape. Each swivel plate assembly 61 has a winged, U-shaped plate bracket, pivot member 63 bolted to the flat plate 57. The U portion of this bracket, pivot member 63 rides in a receiving cupped portion of a bearing pad or journal 65. A clamp 67 extends about the U portion of the pivot member 63 and the journal receiving portion to hold the assembly to the rectangular support tube 59.

The truss cross bar 40 is welded into position to the bottom flanges of the side rails 13 to extend laterally across the trailer frame, once the wheel and axle assembly 15 position is determined. The purpose of the truss cross bar 40 is to securely tie (box) the side rails together. The purpose of the truss structure assembly 44 is to transfer much of the load directly to the running gear (wheel and axle assembly 15) instead of bending forces on the side rails 13. This is accomplished by positioning the wheel and axle attachments to the side rails 13 immediately adjacent the bunk carrying cross beams 21, 23 attachment positions.

Figure 9:
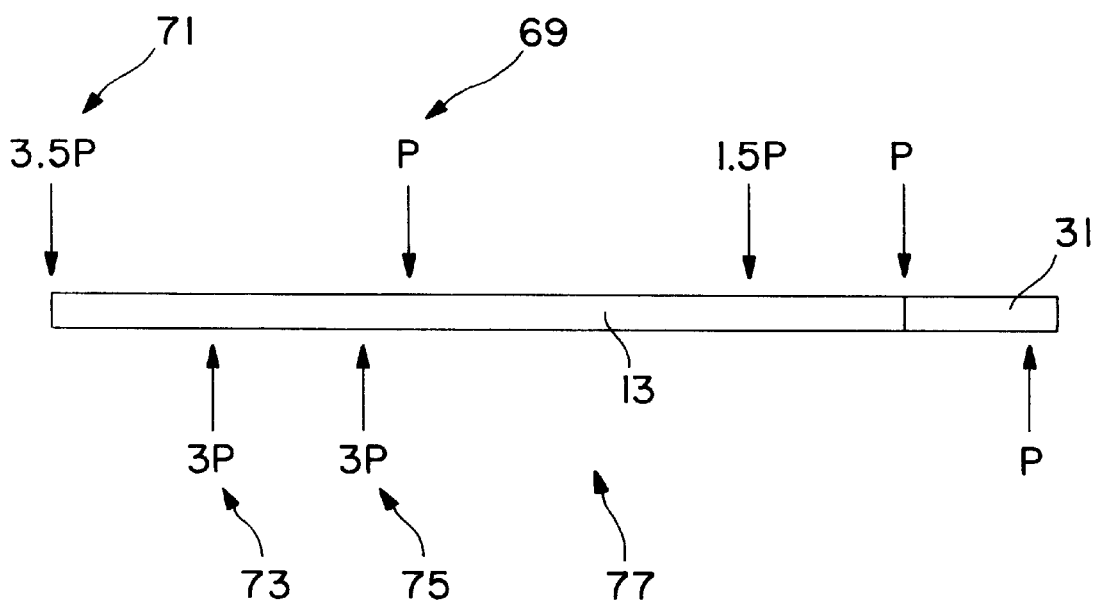
FIG. 9 is a distribution diagram for the boat load forces and the hitch and axle support forces on the frame side rails and hitch tube of the trailer.

The load distribution, FIG. 9, on the main frame members, these being the side rails 13 joined with the hitch support tube 31, is such that bending is minimized. By extending the bunks 17 substantially beyond the end of the frame subassembly 13, 31, the resultant load at the front bunk support position 69 is reduced. The resultant load at the rear bunk support position 71 is increased. By positioning the front most bunk support position 69 just slightly forward of the axle support positions 73, 75 the bending forces on the middle span 77 of the frame are reduced. The weight effects which cause bending to the middle unsupported section 77 are minimized.

With the incorporation of the truss structure assembly 44, a major portion of the side rails 13 is tied into the wheel and axle assembly 15. This provides a stronger frame construction and will enable the bunk assemblies 17 to moved forward on the trailer 11. This allows the load center to be positioned forward or behind the wheel and axle assembly 15, and still be fully supported at the transom.

Figure 10:
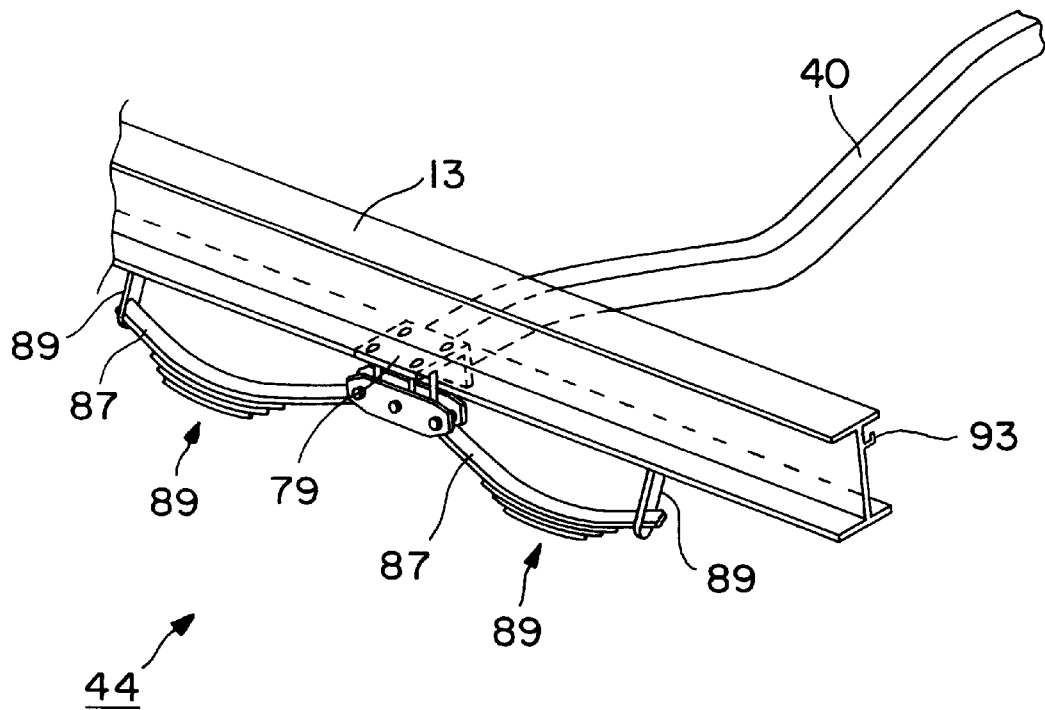
FIG. 10 shows a perspective partial assembly of the wheel axle truss assembly to a side rail.
Figure 11:
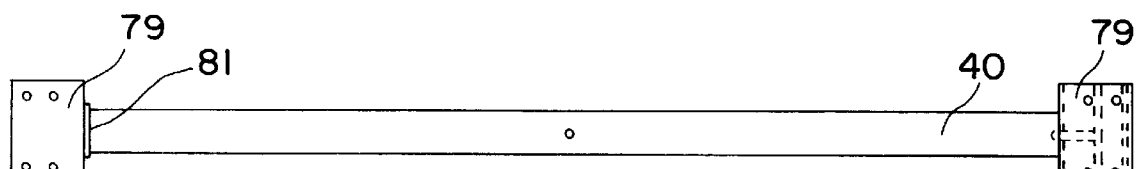
FIG. 11 is a top plan view of the truss cross bar with side rail and spring attachment brackets.
Figure 12:
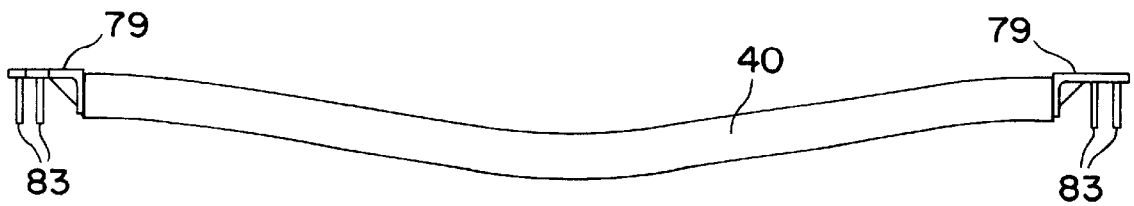
FIG. 12 is a side view of the truss cross bar of FIG. 11.
Figure 13:
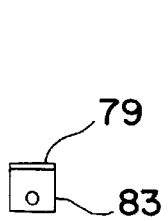
FIG. 13 is an end view of the attachment bracket of FIGS. 11 and 12.

The attachment of the truss cross bar 40 to a side rail 13 is shown in FIG. 10. Here the bar 40 is bolted to the bottom flange of the side rail 13. An L-shaped cross bar mounting bracket 79 is butt welded 81, FIG. 11, to the end of the cross bar 40. This bracket 79 is bolted, in this instance, on its top face to the bottom flange of the side rail 13. A pair of downward extending plates 83 extend from the top wall of the L-shaped bracket 79, and are used to hold the end links 85 for the adjacent ends of a pair of tandem mounted leaf springs 87. The opposite ends of the leaf springs 87 may be bracketed 89 or otherwise attached to the side rail 13 in a conventional manner. The respective axle for each wheel 46 is attached 89 in a conventional manner to a respective leaf spring 87. Each truss cross bar 40 end bracket 79 can also include a vertical stiffening plate 91, triangularly shaped and positioned inboard of the pair of downward extending plates 83, stiffens the bracket 79 to keep the L-shape thereof.

Figure 14:
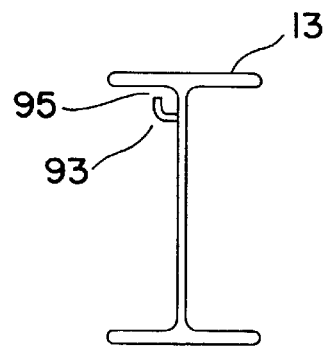
FIG. 14 is an end view of a side rail showing an electrical conduit channel.

A channel 93 extends longitudinally the length of at least on of the side rails 13. This channel 93 is positioned on in inboard face of the side rail 13 I-beam web, adjacent the underside of the top flange. The channel has a J-shaped cross section, creating longitudinal slot or opening 95, FIG. 14, running along the underside of the top flange of the side rail 13. This allows a wiring harness or conduit to be slipped into the channel 93 to be run the length of the side rail 13.

Many changes can be made in the above-described invention without departing from the intent and scope thereof. It is thereby intended that the above description be read in the illustrative sense and not in the limiting sense.

What is claimed is:

1. An aluminum bunk beam boat trailer, comprising:

a pair of aluminum side rails;

a trailer hitch carried on an aluminum hitch support tube attached to the forward ends of said aluminum side rails;

a plurality of aluminum cross members connected between said side rails;

at least one axle and wheel assembly supporting the rear portion of the trailer and attached to the side rails thereof;

a pair of bunk assemblies, mounted to a rear support, being a said cross member connected between side rails at the rearward ends thereof, and mounted to a front support, being a said cross member connected between said side rails adjacent to and immediately forward the position of said axle and wheel assembly;

wherein at least 70 percent of said bunk assemblies is rearward of said axle and wheel assembly, and at least 30 percent of said bunk assemblies extends rearward of the end of said side rail beyond said bunk assemblies rear support, and a truss assembly support mounted between said axle and wheel assembly and said aluminum side rails;

wherein said truss assembly support transfers said load from said bunk assemblies to said axle and wheel assembly through said pair of side rails;

wherein said transfer of said load from said bunk assemblies to said axle and wheel assembly is without appreciable flexural force upon said pair of side rails; and wherein said truss assembly support includes:

a truss cross bar connecting said pair of side rails adjacent to said axle and wheel assembly and boxing said side rails against torsion;

at least one bracket mounted to each end of said truss cross bar, said end bracket facilitating said truss cross bar to side rail connection;

a least a pair of leaf springs connected one each on one end to a respective one of said truss cross bar end brackets, wherein the other end of each said leaf spring is connected to its respective side rail a distance from said truss cross bar end bracket; and the axle of said axle and wheel assembly connected to support the mid-point of each respective side rail connected leaf spring;

wherein the expanse of said leaf spring forms a truss supported section of each respective side rail.

2. The boat trailer of claim 1 also including a bow roller assembly extending between said pair of side rails near the front of said trailer.

3. The boat trailer of claim 2 wherein said bow roller assembly includes:

a cross bar connected between said side rails;

an upstanding post connected to said cross bar;

a bracket connected to said upstanding post;

a roller mounted on said bracket; and a keel engaging guide extending upwardly and outwardly from said upstanding post adjacent to said roller bracket.

4. The boat trailer of claim 3 wherein said keel engaging guide is wing shaped with a flat top surface.

5. The boat trailer of claim 4 wherein said keel engaging guide flat top surface includes a rubber slide surface portion.

6. The boat trailer of claim 5 also including a wiring conduit channel extending longitudinally along at least one of said side rails.

7. The boat trailer of claim 6 wherein each said side rail is I-beam shaped.

8. The boat trailer of claim 7 wherein said wiring conduit channel extends along the top portion of the web of said I-beam shaped side rail, adjacent to the top flange thereof.

9. The trailer of claim 8 wherein said wiring conduit channel includes a longitudinal slot adjacent said I-beam top flange.

10. The boat of claim 9 wherein each said bunk assembly includes:

a longitudinally extending bunk plate;

at least a pair of support brackets each holding said bunk plate; and a swivel plate assembly connected between each said support bracket and the respective said cross member.

11. An aluminum side rail, bunk beam boat trailer, comprising:

a pair of aluminum side rails forming the right and left frame members and extending towards each other at the front of said trailer;

a hitch support tube extending forward of the front end of said side rails;

at least a pair of bunk support members each extending transversely between said side rails and attached thereto;

a tandem axle and wheel assembly;

a tandem leaf spring assembly connected to said tandem axle and wheel assembly;

wherein the common ends of each tandem leaf spring of said assembly is connected to a bracket intermediate said ends and the opposite ends of said leaf springs are connected directly to said respective side rail; and a cross member intermediate said tandem axles, said cross member being attached to each side rail and each said tandem spring intermediate bracket.

12. The boat trailer of claim 11 also including a wiring harness conduit extending along at least one of said side rails.

13. The boat trailer of claim 12 wherein each side rail is I-beam shaped, and wherein said intermediate tandem axles cross member is connected to the bottom flange of each I-beam shaped side rail by said spring intermediate bracket.

14. The boat trailer of claim 13 wherein each said spring intermediate bracket is L-shaped and includes a pair of downward extending plates from the top face thereof, and a pair of spring links connected one each to each said downward extending plate, and a bolt engaging a said spring end and said pair of links.

15. The boat trailer of claim 14 wherein each spring intermediate bracket includes a vertical extending stiffening plate supporting the L shape of said bracket.

* * * * *